(12) United States Patent
Ferman et al.

(10) Patent No.: US 8,208,725 B2
(45) Date of Patent: Jun. 26, 2012

(54) METHODS AND SYSTEMS FOR IDENTIFYING TEXT ORIENTATION IN A DIGITAL IMAGE

(75) Inventors: Ahmet Mufit Ferman, Vancouver, WA (US); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1056 days.

(21) Appl. No.: 11/766,640

(22) Filed: Jun. 21, 2007

(65) Prior Publication Data

US 2008/0317343 A1    Dec. 25, 2008

(51) Int. Cl.
  *G06K 9/00* (2006.01)
  *G06K 9/34* (2006.01)
  *G06K 9/36* (2006.01)
  *G06F 17/00* (2006.01)
(52) U.S. Cl. ......... 382/177; 382/168; 382/291; 715/204
(58) Field of Classification Search ............... 382/168, 382/177–188, 291; 715/204
  See application file for complete search history.

(56) References Cited

U.S. PATENT DOCUMENTS

| | | | |
|---|---|---|---|
| 5,020,117 A | 5/1991 | Ooi | |
| 5,031,225 A | 7/1991 | Tachikawa | |
| 5,060,276 A | 10/1991 | Morris | |
| 5,077,811 A | 12/1991 | Onda | |
| 5,191,438 A | 3/1993 | Katsuranda | |
| 5,235,651 A | 8/1993 | Nafarieh | |
| 5,251,268 A | 10/1993 | Colley | |
| 5,276,742 A | 1/1994 | Dasari | |
| 5,319,722 A | 6/1994 | Oki | |
| 5,471,549 A | 11/1995 | Kurosu | |
| 5,508,810 A | 4/1996 | Sata | |
| 5,640,466 A * | 6/1997 | Huttenlocher et al. | 382/177 |
| 5,664,027 A | 9/1997 | Ittner | |
| 5,689,585 A * | 11/1997 | Bloomberg et al. | 382/229 |
| 5,835,632 A | 11/1998 | Takasu | |
| 5,889,884 A | 3/1999 | Hashimoto et al. | |
| 5,923,790 A | 7/1999 | Miwa et al. | |
| 5,930,001 A | 7/1999 | Satoh | |
| 5,987,171 A | 11/1999 | Wang | |
| 5,987,176 A | 11/1999 | Imaizumi et al. | |
| 6,011,877 A | 1/2000 | Ishikawa | |
| 6,101,270 A | 8/2000 | Takahashi | |
| 6,104,832 A | 8/2000 | Saito | |
| 6,137,905 A | 10/2000 | Takaoka | |
| 6,151,423 A | 11/2000 | Melen | |
| 6,169,822 B1 | 1/2001 | Jung | |
| 6,173,088 B1 | 1/2001 | Koh | |

(Continued)

FOREIGN PATENT DOCUMENTS

EP    1073001    1/2001

(Continued)

OTHER PUBLICATIONS

Japanese Office Action—Japanese Patent Application No. 2008-162466—Mailing Date Aug. 17, 2010.

(Continued)

*Primary Examiner* — Aaron W Carter
(74) *Attorney, Agent, or Firm* — Kristine Elizabeth Matthews; David C. Ripma

(57) ABSTRACT

Aspects of the present invention relate to systems and methods for determining text orientation in a digital image.

21 Claims, 11 Drawing Sheets

U.S. PATENT DOCUMENTS

| | | |
|---|---|---|
| 6,188,790 B1 | 2/2001 | Yoshikawa et al. |
| 6,249,353 B1 | 6/2001 | Yoshida et al. |
| 6,266,441 B1 | 7/2001 | Hashimoto |
| 6,304,681 B1 | 10/2001 | Akiba |
| 6,320,983 B1 | 11/2001 | Matsuno |
| 6,360,028 B1 | 3/2002 | Kaji |
| 6,411,743 B1 | 6/2002 | Koh |
| 6,501,864 B1 | 12/2002 | Eguchi |
| 6,574,375 B1 | 6/2003 | Cullen |
| 6,624,905 B1 | 9/2003 | Ikegami |
| 6,633,406 B1 | 10/2003 | Imaizumi et al. |
| 6,798,905 B1 | 9/2004 | Sugiura |
| 6,804,414 B1 | 10/2004 | Sakai |
| 6,941,030 B2 | 9/2005 | Kakutani et al. |
| 6,993,205 B1 | 1/2006 | Lorie |
| 7,031,553 B2 | 4/2006 | Myers |
| 7,151,860 B1 | 12/2006 | Sakai |
| 7,286,718 B2 * | 10/2007 | Aradhye .................. 382/290 |
| 7,580,571 B2 | 8/2009 | Ohguro |
| 2001/0013938 A1 | 8/2001 | Usami |
| 2001/0028737 A1 | 10/2001 | Takakura |
| 2003/0049062 A1 | 3/2003 | Machida |
| 2003/0086721 A1 | 5/2003 | Guillemin |
| 2003/0152289 A1 | 8/2003 | Luo |
| 2003/0210437 A1 | 11/2003 | Machida |
| 2004/0001606 A1 | 1/2004 | Levy |
| 2004/0179733 A1 | 9/2004 | Okubo |
| 2004/0218836 A1 | 11/2004 | Kanatsu |
| 2005/0041865 A1 | 2/2005 | Zhen |
| 2005/0163399 A1 | 7/2005 | Aradhye |
| 2006/0018544 A1 | 1/2006 | Ohguro |
| 2006/0033967 A1 | 2/2006 | Brunner |
| 2006/0210195 A1 | 9/2006 | Ohguro |
| 2006/0215230 A1 | 9/2006 | Borrey |
| 2008/0175516 A1 * | 7/2008 | Aradhye .................. 382/290 |
| 2009/0213085 A1 * | 8/2009 | Zhen et al. .................. 345/173 |

FOREIGN PATENT DOCUMENTS

| | | |
|---|---|---|
| GB | 2383223 | 6/2003 |
| JP | 2116987 A | 5/1990 |
| JP | 9130516 A | 5/1997 |
| JP | 2002109470 A | 4/2002 |
| JP | 2004246546 A | 9/2004 |
| JP | 2005141603 A | 6/2005 |
| JP | 2006343960 A | 12/2006 |
| WO | WO 2007/050267 * | 5/2007 |

OTHER PUBLICATIONS

Japanese Office Action—Japanese Patent Application No. 2008-162466—Mailing Date Nov. 9, 2010.

Japanese Office Action—Japanese Patent Application No. 2008-162465—Mailing Date Jan. 25, 2011.

USPTO Office Action—U.S. Appl. No. 11/766,661—Dated Jan. 7, 2011.

USPTO Office Action—U.S. Appl. No. 11/766,661—Mailing Date Jun. 15, 2011.

USPTO Notice of Allowance—U.S. Appl. No. 11/766,661—Mailing Date Nov. 23, 2011.

* cited by examiner

METHODS AND SYSTEMS FOR IDENTIFYING TEXT ORIENTATION IN A DIGITAL IMAGE

FIELD OF THE INVENTION

Embodiments of the present invention comprise methods and systems for determining text orientation in a digital image.

BACKGROUND

Page orientation in an electronic document may not correspond to page orientation in the original document, referred to as the nominal page orientation, due to factors which may comprise scan direction, orientation of the original document on the scanner platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example optical character recognition (OCR), may require specifically orientated input data. Additionally, if the page orientation of an electronic document is unknown relative to the nominal page orientation, proper orientation for display on a viewing device, for example a computer monitor, handheld display and other display devices, may not be achieved.

SUMMARY

Some embodiments of the present invention comprise methods and systems for determining text orientation in a digital image. In some embodiments of the present invention, the orientation of a line of text in a digital image may be determined. Alignment features relative to a first side and a second side of the line of text may be calculated, and the orientation of the text in the text line may be determined based on the alignment features and the relative frequency of text characters with descenders and text characters with ascenders in the written text of a particular language or group of languages.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 12:
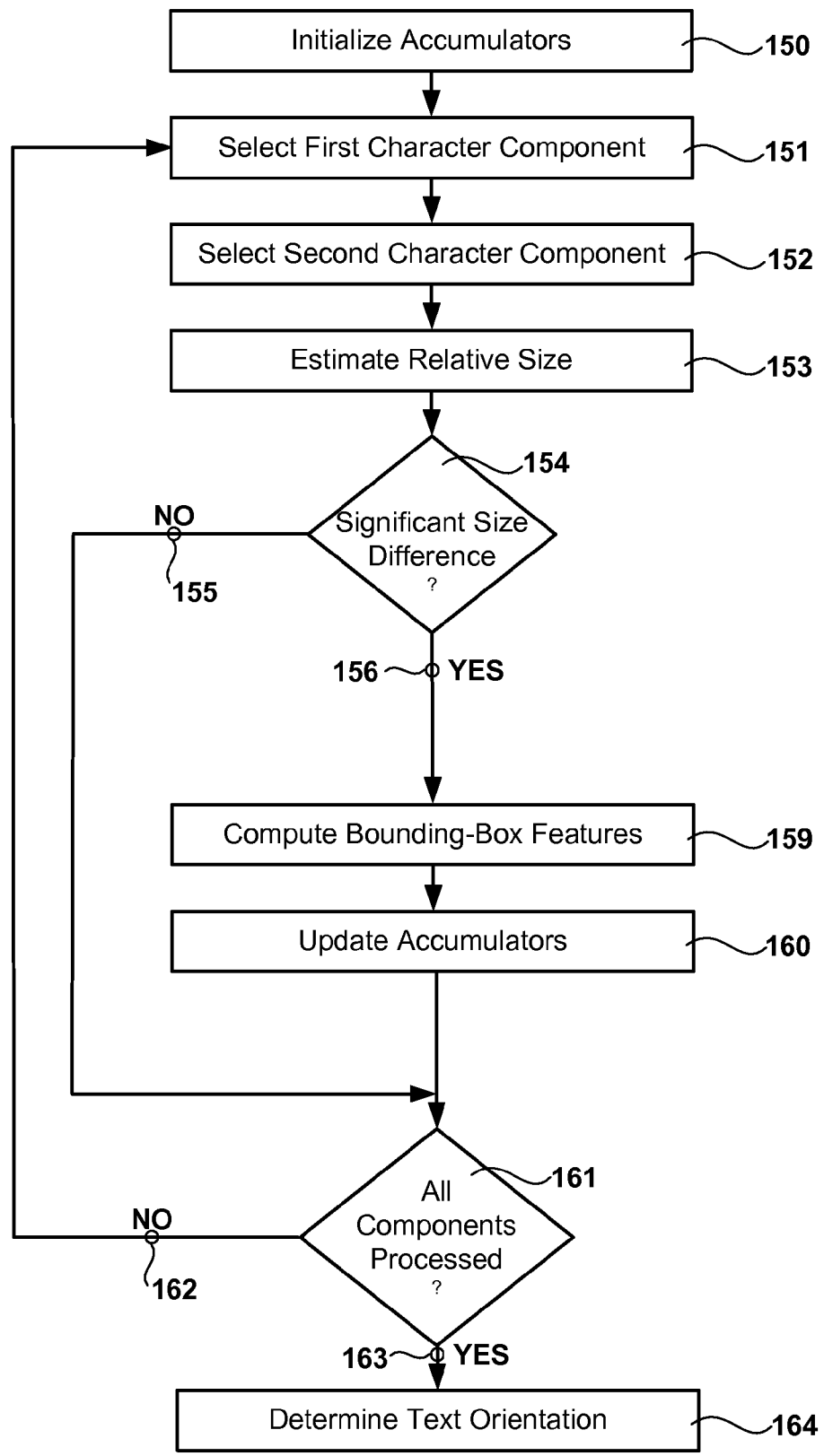
Figure 13:
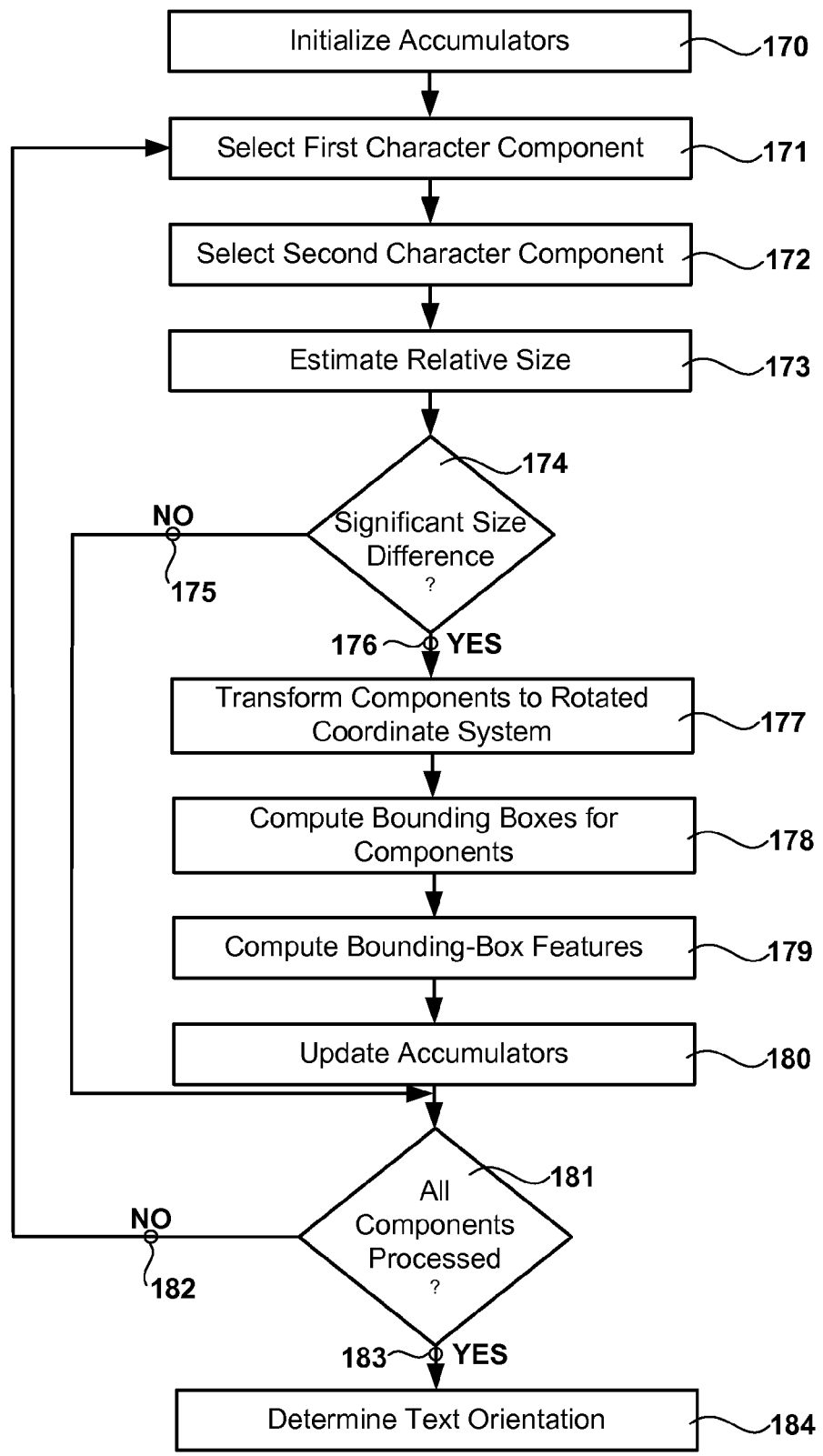

FIG. 12 is a chart showing embodiments of the present invention comprising text-orientation detection using character pair feature measurements for character pairs wherein the characters may be significantly different in size; and FIG. 13 is a chart showing embodiments of the present invention comprising text-orientation detection in a skewed document using character pair feature measurements for character pairs wherein the characters may be significantly different in size.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Page orientation in an electronic document may not correspond to page orientation in the original document, referred to as the nominal page orientation, due to factors which may comprise scan direction, orientation of the original document on the scanner platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example optical character recognition (OCR), may require specifically orientated input data. Additionally, if the page orientation of an electronic document is unknown relative to the nominal page orientation, proper orientation for display on a viewing device, for example a computer monitor, handheld display and other display devices, may not be achieved.

Some embodiments of the present invention relate to automatic detection of a dominant text orientation in an electronic document. Text orientation may be related to the nominal page orientation.

Figure 1A:
FIG. 1A is a drawing showing a descenders and ascenders in an exemplary text line.
Figure 1B:
FIG. 1B is a drawing showing an exemplary line of Cyrillic text characters.
Figure 1C:
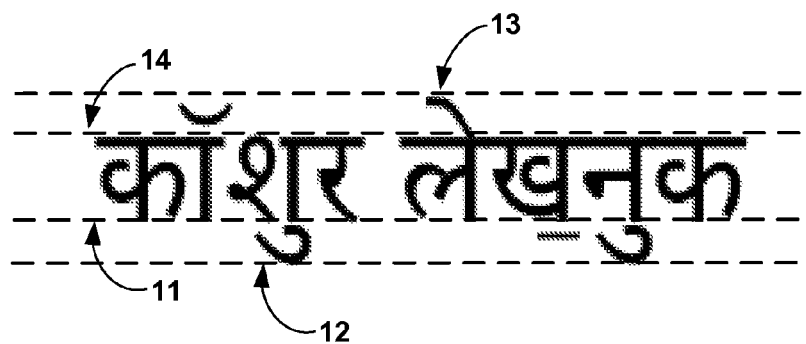
FIG. 1C is a drawing showing an exemplary line of Devanāgarī text characters.

Typographical-related terms, described in relation to FIGS. 1A-1C, may be used in the following descriptions of embodiments of the present invention. This terminology may relate to the written text characters, also considered letters and symbols, of written languages, including, but not limited to, those languages that use the Latin, Greek, Cyrillic, Devanāgarī and other alphabets. FIG. 1A shows a line of Latin alphabet text. FIG. 1B is a line of Cyrillic characters, and FIG. 1C is a line of Devanāgarī characters. The term baseline may refer to the line 1, 7, 11 on which text characters sit. For Latin-alphabet text, this is the line on which all capital letters and most lowercase letters are positioned. A descender may be the portion of a letter, or text character, that extends below the baseline 1, 7, 11. Lowercase letters in the Latin alphabet with descenders are "g," "j," "p," "q" and "y." The descender line may refer to the line 2, 8, 12 to which a text character's descender extends. The portion of a character that rises above the main body of the character may be referred to as the ascender. Lowercase letters in the Latin alphabet with ascenders are "b," "d," "f," "h," "k," "l" and "t." Uppercase letters in the Latin alphabet may be considered ascenders. The ascender line may refer to the line 3, 9, 13 to which a text character's ascender extends. The height 4 of lowercase letters in the Latin alphabet, such as "x," which do not have ascenders or descenders may be referred to as the x-height. The line 5, 10, 14 marking the top of those characters having no ascenders or descenders may be referred to as the x line. The height 6 of an uppercase letter may be referred to as the cap-height.

In the standard Latin alphabet, there are seven text characters with ascenders and five text characters with descenders. Furthermore, as shown in Table 1, text characters with ascenders (shown in bold in Table 1) occur with greater relative frequency than text characters with descenders (shown in italics in Table 1) in a large mass of representative English-language text content. The relative frequency of Latin-alphabet text characters may be different for text in other languages, for example European languages based on Latin script. Additionally, in some alphabets, for example the Cyrillic alphabet, the number of text characters with descenders may be greater than the number of text characters with ascenders.

Embodiments of the present invention may use the relative occurrence rates of text characters with ascenders and text characters with descenders in determining text orientation and page orientation in a digital document image. Exemplary embodiments may be described in relation to English-language text. These embodiments are by way of example and not limitation.

For the purposes of description, and not limitation, in this specification and drawings, a coordinate system with the origin in the upper-left corner of the digital document image may be used. The horizontal coordinate axis may be referred to as the x-coordinate axis and may extend in the positive direction across the digital document image from the origin. The vertical coordinate axis may be referred to as the y-coordinate axis and may extend in the positive direction down the digital document image.

Embodiments of the present invention may comprise methods and systems for determining text orientation by computing features between text characters. In these embodiments, a binary text map may be produced from an input image of an electronic document. Individual text characters may be represented as contiguous sets of pixels in the binary text map.

TABLE 1

Relative Frequencies of Letters in Representative English-Language Text Content

| LETTER | RELATIVE FREQUENCY |
|--------|--------------------|
| e | 12.70% |
| t | 9.06% |
| a | 8.17% |
| o | 7.51% |
| i | 6.97% |
| n | 6.75% |
| s | 6.33% |
| h | 6.09% |
| r | 5.99% |
| d | 4.25% |
| l | 4.03% |
| c | 2.78% |
| u | 2.76% |
| m | 2.41% |
| w | 2.36% |
| f | 2.23% |
| g | *2.02%* |
| y | *1.97%* |
| p | *1.93%* |
| b | 1.49% |
| v | 0.98% |
| k | 0.77% |
| j | *0.15%* |
| x | 0.15% |
| q | *0.095%* |
| z | 0.074% |

Figure 2A:
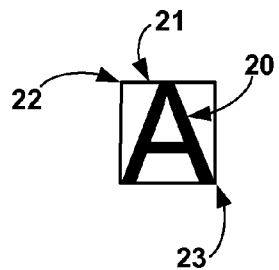
FIG. 2A is a drawing showing a character bounding box for an exemplary text character.

In some embodiments of the present invention, individual text characters in a digital document image may be grouped into text lines, also considered sequences of characters. An individual text character 20, as shown in FIG. 2A, may be described by an associated bounding box 21. In some embodiments of the present invention, a text-character bounding box 21 may be a box by which the associated text character 20 is substantially circumscribed. In alternative embodiments of the present invention, the text-character bounding box 21 may be a box in which the associated text character 20 is wholly contained. The bounding box 21 may be characterized by the coordinates of two opposite corners, for example the top-left corner 22, denoted $(x_1, y_1)$, and the bottom-right corner 23, denoted $(x_2, y_2)$, of the bounding box 21, a first corner, for example the top-left corner 22, denoted $(x_1, y_1)$, and the extent of the bounding box in two orthogonal directions from the first corner, denoted dx,dy, or any other method of describing the size and location of the bounding box 21 in the digital document image.

Figure 2B:
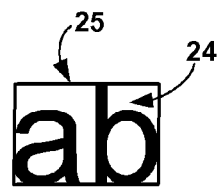
FIG. 2B is a drawing showing a text-object bounding box for an exemplary text object.

A text object, which may comprise one or more text characters, may be described by a text-object bounding box. FIG. 2B depicts an exemplary text object 24 and text-object bounding box 25.

Figure 3:
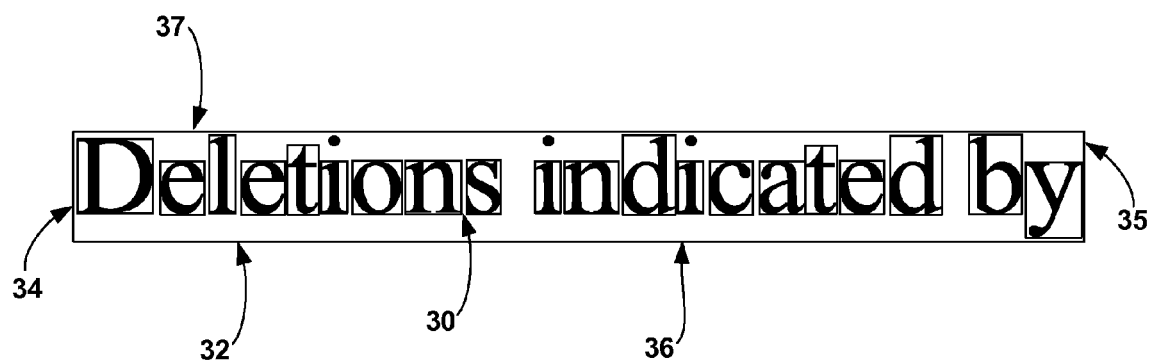
FIG. 3 is a drawing showing an exemplary text line with character bounding boxes and a text-line bounding box.

A text line 30, as shown in FIG. 3, may be described by an associated text-line bounding box 32. In some embodiments of the present invention, the text-line bounding box 32 may be a box by which the associated text line 30 is substantially circumscribed. In alternative embodiments of the present invention, the text-line bounding box 32 may be a box in which the associated text line 30 is wholly contained. The text-line bounding box 32 may be described by the x-coordinate of the left edge 34, denoted $x_L$, the x-coordinate of the right edge 35, denoted $x_R$, the y-coordinate of the bottom edge 36, denoted $y_B$ and the y-coordinate of the top edge 37, denoted $y_T$ or any other method of describing the size and location of the text-line bounding box 32 in the digital document image.

In some embodiments of the present invention, a text-line bounding box 32 may be determined from the bounding boxes of the constituent text characters, or text objects, within the text-line 30 according to:

$y_T = \min\{y_1(i)\}, i=1, \ldots, N,$ $y_B = \max\{y_2(i)\}, i=1, \ldots, N,$ $x_L = \min\{x_1(i)\}, i=1, \ldots, N$ and $x_R = \max\{x_2(i)\}, i=1, \ldots, N,$ where N is the number of text characters, or text objects, in the text line, $y_1(i)$ and $y_2(i)$ are the $y_1$ and $y_2$ coordinate values of the ith text-character, or text-object, bounding box, respectively, and $x_1(i)$ and $x_2(i)$ are the $x_1$ and $x_2$ coordinate values of the ith text-character, or text-object, bounding box, respectively.

In some embodiments of the present invention, alignment features may be calculated for a text line in a digital document image. The alignment features may comprise a top-alignment feature and a bottom-alignment feature. For documents comprising English-language text, it may be expected that a text line may comprise more text characters with ascenders than descenders. Therefore, it may be expected that the baseline-side bounding box coordinates will have less variability than the x-line-side bounding box coordinates. Therefore, it may be expected that text lines may be aligned with less variability along the baseline, or equivalently, greater variability along the x line.

In some embodiments of the present invention, a text line may be determined to be oriented horizontally in the digital document image if $(x_2-x_1) \geq (y_2-y_1)$ and oriented vertically otherwise. In alternative embodiments of the present invention, a text line may be determined to be oriented horizontally in the digital document image if $(x_2-x_1) > (y_2-y_1)$ and oriented vertically otherwise.

In alternative embodiments of the present invention, horizontal/vertical text-line orientation may be determined based on the aspect ratio of the text line. In an exemplary embodiment, if the aspect ratio $$\frac{x_R - x_L}{y_B - y_T}$$

of the text line is less than a threshold, denoted $T_{ar}$, where $T_{ar} \ll 1$, then the text line may be labeled as a vertically-orient text line. Otherwise the text line may be labeled as a horizontally-oriented text line.

For a line of text, denoted t, oriented horizontally in the digital document image, a ceiling value, denoted ceil(t), and a floor value, denoted floor(t), may be calculated according to:

$$\text{ceil}(t) = \frac{1}{N}\sum_{i=1}^{N} y_1(i) \text{ and } \text{floor}(t) = \frac{1}{N}\sum_{i=1}^{N} y_2(i),$$

where N is the number of text characters in text line t, and $y_1(i)$ and $y_2(i)$ are the $y_1$ and $y_2$ coordinate values of the ith text character bounding box, respectively. The ceiling value may be considered a sample mean of the $y_1$ coordinate values, and the floor value may be considered a sample mean of the $y_2$ coordinate values.

For a line of text, denoted t, oriented vertically in the digital document image, a ceiling value, denoted ceil(t), and a floor value, denoted floor(t), may be calculated according to:

$$\text{ceil}(t) = \frac{1}{N}\sum_{i=1}^{N} x_1(i) \text{ and } \text{floor}(t) = \frac{1}{N}\sum_{i=1}^{N} x_2(i),$$

where N is the number of text characters in text line t, and $x_1(i)$ and $x_2(i)$ are the $x_1$ and $x_2$ coordinate values of the ith text character bounding box, respectively. The ceiling value may be considered a sample mean of the $x_1$ coordinate values, and the floor value may be considered a sample mean of the $x_2$ coordinate values.

The error between the samples and the corresponding sample mean may be an indicator of where the text baseline is located. Top and bottom error measures may be calculated and may be used as top- and bottom-alignment features.

For a line of text, denoted t, oriented horizontally in the digital document image, exemplary error measure may comprise:

Mean Absolute Error (MAE) calculated according to:

$$e_{MAE}^{top}(t) = \frac{1}{N}\sum_{i=1}^{N} |y_1(i) - \text{ceil}(t)|, e_{MAE}^{bottom}(t) = \frac{1}{N}\sum_{i=1}^{N} |y_2(i) - \text{floor}(t)|;$$

Mean-Square Error (MSE) calculated according to:

$$e_{MSE}^{top}(t) = \frac{1}{N}\sum_{i=1}^{N} (y_1(i) - \text{ceil}(t))^2,$$

$$e_{MSE}^{bottom}(t) = \frac{1}{N}\sum_{i=1}^{N} (y_2(i) - \text{floor}(t))^2;$$

Root Mean-Square Error (RMSE) calculated according to:

$$e_{RMSE}^{top}(t) = \sqrt{e_{MSE}^{top}(t)}, e_{RMSE}^{bottom}(t) = \sqrt{e_{MSE}^{bottom}(t)}; \text{ and}$$

other error measures.

For a line of text, denoted t, oriented vertically in the digital document image, exemplary error measure may comprise:

Mean Absolute Error (MAE) calculated according to:

$$e_{MAE}^{top}(t) = \frac{1}{N}\sum_{i=1}^{N}|x_1(i) - \text{ceil}(t)|, \; e_{MAE}^{bottom}(t) = \frac{1}{N}\sum_{i=1}^{N}|x_2(i) - \text{floor}(t)|;$$

Mean-Square Error (MSE) calculated according to:

$$e_{MSE}^{top}(t) = \frac{1}{N}\sum_{i=1}^{N}(x_1(i) - \text{ceil}(t))^2,$$

$$e_{MSE}^{bottom}(t) = \frac{1}{N}\sum_{i=1}^{N}(x_2(i) - \text{floor}(t))^2;$$

Root Mean-Square Error (RMSE) calculated according to:

$$e_{RMSE}^{top}(t) = \sqrt{e_{MSE}^{top}(t)}, \; e_{RMSE}^{bottom}(t) = \sqrt{e_{MSE}^{bottom}(t)}; \text{ and}$$

other error measures.

Other top- and bottom-alignment features may be based on the distances between the top of the text-line bounding box, or other top-side reference line, and the top of each character bounding box and the bottom of the text-line bounding box, or other bottom-side reference line, and the bottom of the text-line bounding box and the bottom of each character bounding box, respectively. The distances may be denoted $\Delta_{top}$ and $\Delta_{bottom}$, respectively, and may be calculated for each character in a text line according to:

$$\Delta_{top}(i) = y_1(i) - y_T, \; i=1,\ldots,N \text{ and } \Delta_{bottom}(i) = y_B(t) - y_2, \; i=1,\ldots,N$$

for horizontally oriented text lines, and $$\Delta_{top}(i) = x_1(i) - x_L, \; i=1,\ldots,N \text{ and } \Delta_{bottom}(i) = x_r(i) - x_2, \; i=1,\ldots,N$$

for vertically oriented text lines. The corresponding top- and bottom alignment features may be calculated for horizontally-oriented and vertically-oriented text lines according to:

$$u_{top}(t) = \sum_{i=1}^{N}|\Delta_{top}(i) - \Delta_{top}^{max}| \text{ and } u_{bottom}(t) = \sum_{i=1}^{N}|\Delta_{bottom}(i) - \Delta_{bottom}^{max}|$$

where $\Delta_{top}^{max} = \max \Delta_{top}(i), i=1,\ldots,N$ and $\Delta_{bottom}^{max} = \max \Delta_{bottom}(i), i=1,\ldots,N$.

In some embodiments of the present invention, the orientation of a text line in English-language text, and other-language text with relatively more text characters with ascenders than text characters with descenders, may be determined based on a top-alignment feature, denoted $F_{top}$, and a bottom-alignment feature, denoted $F_{bottom}$, of which exemplary top-alignment features and bottom-alignment features may be as described above. For a horizontally-oriented text line, when $F_{bottom} < F_{top}$, the baseline of the text line may be on the bottom side (larger y-coordinate value) of the text line, and the orientation of the digital document image may be considered to be the same orientation as the original document (0° rotation). For a horizontally-oriented text line, when $F_{bottom} > F_{top}$, the baseline of the text line may be on the top side (smaller y-coordinate value) of the text line, and the orientation of the digital document image may be considered to be 180° clockwise (or counter-clockwise) with respect to the orientation of the original document. For a vertically-oriented text line, when $F_{bottom} < F_{top}$, the baseline of the text line may be on the right side (larger x-coordinate value) of the text line, and the orientation of the digital document image may be considered to be 270° clockwise (or 90° counter-clockwise) with respect to the orientation of the original document. That is, the original document image may be rotated 270° clockwise (or 90° counter-clockwise) to produce the digital document image, or the digital document image may be rotated 90° clockwise (or 270° counter-clockwise) to produce the original document image. For a vertically-oriented text line, when $F_{bottom} > F_{top}$, the baseline of the text line may be on the left side (smaller x-coordinate value) of the text line, and the orientation of the digital document image may be considered to be 90° clockwise (or 270° counter-clockwise).

In some embodiments of the present invention, the orientation of a text line in a language in which the text may have relatively more text characters with descenders than text characters with ascenders may be determined based on a top-alignment feature, denoted $F_{top}$, and a bottom-alignment feature, denoted $F_{bottom}$, of which exemplary top-alignment features and bottom-alignment features may be as described above. For a horizontally-oriented text line, when $F_{top} < F_{bottom}$, the baseline of the text line may be on the bottom side (larger y-coordinate value) of the text line, and the orientation of the digital document image may be considered to be the same orientation as the original document (0° rotation). For a horizontally-oriented text line, when $F_{top} > F_{bottom}$, the baseline of the text line may be on the top side (smaller y-coordinate value) of the text line, and the orientation of the digital document image may be considered to be 180° clockwise (or counter-clockwise) with respect to the orientation of the original document. For a vertically-oriented text line, when $F_{top} < F_{bottom}$, the baseline of the text line may be on the right side (larger x-coordinate value) of the text line, and the orientation of the digital document image may be considered to be 270° clockwise (or 90° counter-clockwise) with respect to the orientation of the original document. That is, the original document image may be rotated 270° clockwise (or 90° counter-clockwise) to produce the digital document image, or the digital document image may be rotated 90° clockwise (or 270° counter-clockwise) to produce the original document image. For a vertically-oriented text line, when $F_{top} > F_{bottom}$, the baseline of the text line may be on the left side (smaller x-coordinate value) of the text line, and the orientation of the digital document image may be considered to be 90° clockwise (or 270° counter-clockwise).

Figure 4:
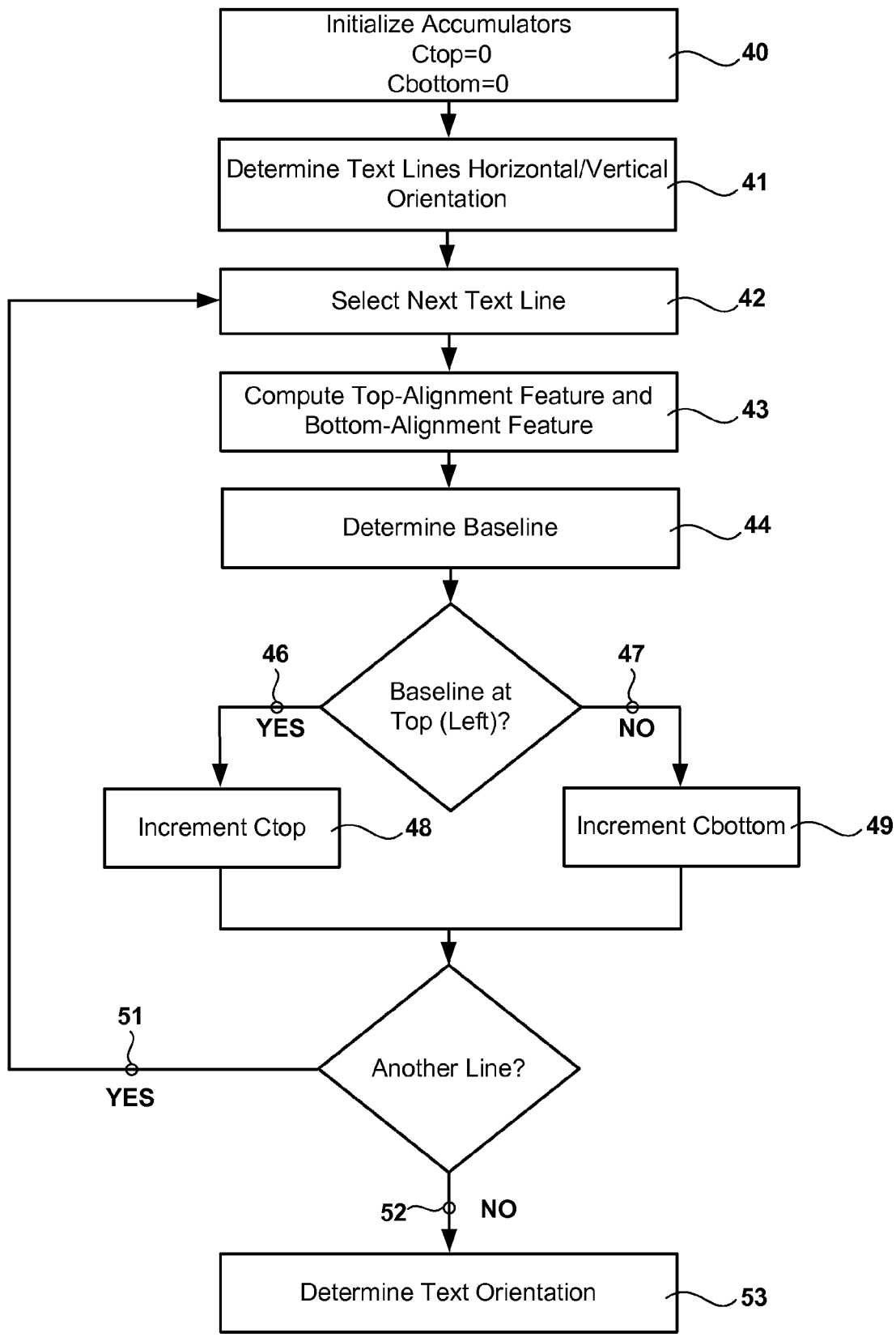
FIG. 4 is a chart showing embodiments of the present invention comprising alignment measurements made in a text line.

In some embodiments of the present invention, described in relation to FIG. 4, baseline position may be determined for multiple text lines. The baseline positions may be accumulated and the orientation of the digital document image may be determined based on the accumulated baseline information. In these embodiments, two counters, or accumulators, may be initialized 40 to zero. One counter, Ctop, may accumulate baselines at the top of the text-line bounding box, for horizontally-aligned text lines, and the left of the text-line bounding box, for vertically-aligned text lines. The other counter, Cbottom, may accumulate baselines at the bottom of the text-line bounding box, for horizontally-aligned text lines, and the right of the text-line bounding box, for vertically-aligned text lines. Vertical/horizontal text-line orientation may be determined 41 as described above. A text line may be selected 42 from the available text lines. A top-alignment feature and a bottom-alignment feature may be computed 43 for the text line. Exemplary alignment features are described above. The text line baseline may be determined 44 as described above. If the baseline is at the top, for horizontally-oriented text lines, or the left, for vertically-oriented text lines, 46, then Ctop may be incremented 48. If the baseline is at the bottom, for horizontally-oriented text lines, or the right, for vertically-oriented text lines, 47, then Cbottom may be incremented 49. If another text line is available 51, then the process may be repeated. If another text line is not available 52, then text orientation for the digital document image may be determined 53.

In some embodiments, every text line may be available initially for processing and may be processed in turn until all text lines have contributed to the accumulation process. In alternative embodiments, every text line may be available initially for processing and may be processed in turn until a termination criterion may be met. In still alternative embodiments, every text line may be available initially for processing and may be processed in random turn until a termination criterion may be met. In yet alternative embodiments, a subset of text lines may be considered available for processing initially and processed in any of the methods described above in relation to every text line being initially available.

Exemplary termination criteria may comprise an absolute number of lines processed, a percentage of initially available lines processed, at least $N_0$ lines processed and $$\frac{\max(Ctop, Cbottom)}{Ctop + Cbottom} \geq N_{threshold}, \max(Ctop, Cbottom) \geq C_{threshold}$$

and other criteria.

In some embodiments, when the text lines are oriented horizontally and Ctop<Cbottom, then the text orientation in the digital document image may be determined 53 as being of the same orientation as the original document. When the text lines are oriented horizontally and Ctop>Cbottom, then the text orientation in the digital document image may be determined 53 as being 180° clockwise (or counter-clockwise) with respect to the orientation of the original document. When the text lines are oriented vertically and Ctop<Cbottom, then the text orientation in the digital document image may be determined 53 as being 270° clockwise (or 90° counter-clockwise) with respect to the orientation of the original document. When the text lines are oriented vertically and Ctop>Cbottom, then the text orientation in the digital document image may be determined 53 as being 90° clockwise (or 270° counter-clockwise) with respect to the orientation of the original document.

In some embodiments of the present invention, multiple top- and bottom-alignment feature pairs may be computed for a text line and text orientation for the text line may be determined for each feature pair. A voting process may be used to make a multi-feature based decision of text orientation for the text line. For example, $O_{MAE}$ may correspond to the orientation based on the feature pair $(e_{MAE}^{top}, e_{MAE}^{bottom})$, $O_{MSE}$ may correspond to the orientation based on the feature pair $(e_{MSE}^{top}, e_{MSE}^{bottom})$ and $O_U$ may correspond to the orientation based on the feature pair $(u_{top}, u_{bottom})$. The orientation for the text line may be determined to be the majority decision of $O_{MAE}$, $O_{MSE}$ and $O_U$.

The above-described embodiments of the present invention may comprise measuring alignment features relative to text lines. In alternative embodiments of the present invention, alignment features may be measured between text-character pairs, or text-object pairs, in a digital document image. In these embodiments, a binary text map may be produced from an input image of an electronic document. Individual text characters may be represented as contiguous sets of pixels in the binary text map.

In some embodiments of the present invention, for each identified text character, α, the nearest neighboring text character, β, in the digital document image may be determined. Four bounding-box features for each character pair (α,β) may be measured according to:

$$\Delta x_1 = |\alpha(x_1) - \beta(x_1)|, \Delta x_2 = |\alpha(x_2) - \beta(x_2)|,$$

$$\Delta y_1 = |\alpha(y_1) - \beta(y_1)|, \Delta y_2 = |\alpha(y_2) - \beta(y_2)|,$$

where $\alpha(x_1), \alpha(x_2), \alpha(y_1), \alpha(y_2)$ and $\beta(x_1), \beta(x_2), \beta(y_1), \beta(y_2)$ are the $x_1, x_x, y_1, y_2$ bounding box coordinates defined above, and described in relation to FIG. 2A, of α and β, respectively.

Figure 5:
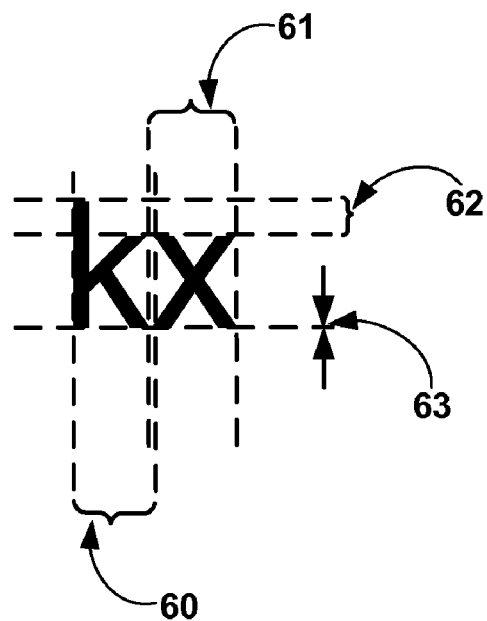
FIG. 5 is a drawing showing an exemplary text character pair.

FIG. 5 shows the four bounding-box features for a character pair oriented at 0°. The difference 60 between the left edges of the text characters corresponds to $\Delta x_1$. The difference 61 between the right edges of the text characters corresponds to $\Delta x_2$. The difference 62 between the top edges of the characters corresponds to $\Delta y_1$, and the difference 63 between the bottom edges of the characters corresponds to $\Delta y_2$.

Figure 6:
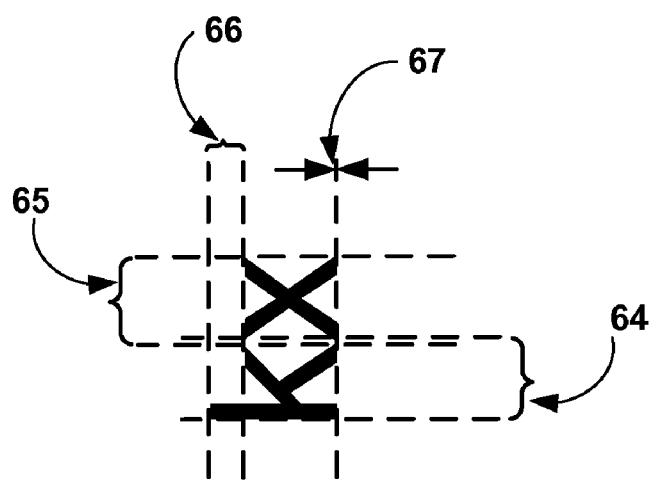
FIG. 6 is a drawing showing an exemplary text character pair.

FIG. 6 shows the four bounding-box features for a character pair oriented at 90° counter clockwise. The difference 64 between the bottom edges of the text characters corresponds to $\Delta y_2$. The difference 65 between the top edges of the text characters corresponds to $\Delta y_1$. The difference 66 between the left edges of the characters corresponds to $\Delta x_1$, and the difference 67 between the right edges of the characters corresponds to $\Delta x_2$.

It may be expected that, for a large number of character-pair, bounding-box feature measurements, the bounding-box feature which has the largest concentration of observed values at, or substantially near to zero, may be related to the orientation of the text represented by the character pairs based on the relative frequency of occurrence of ascenders and descenders in the expected language of the text.

In some embodiments of the present invention, a histogram, denoted hist$\Delta x_1$, hist$\Delta x_2$, hist$\Delta y_1$ and hist$\Delta y_2$, may be constructed for each bounding-box feature, $\Delta x_1$, $\Delta x_2$, $\Delta y_1$ and $\Delta y_2$, respectively. Measurements of the four bounding-box features may be accumulated over many character pairs in the digital document image.

For English-language text and other-language text in which text characters with ascenders occur more frequently than text characters with descenders, the text alignment in the digital document image may be determined according to:

if(max{hist$\Delta x_1$(0), hist$\Delta x_2$(0), hist$\Delta y_1$(0), hist$\Delta y_2$(0)})= hist$\Delta x_1$(0)
    then the text in the digital document image may be oriented 90° clockwise (or 270° counter-clockwise) with respect to the original document text;
if(max{hist$\Delta x_1$(0), hist$\Delta x_2$(0), hist$\Delta y_1$(0), hist$\Delta y_2$(0)})= hist$\Delta x_2$(0)
    then the text in the digital document image may be oriented 270° clockwise (or 90° counter-clockwise) with respect to the original document text;
if(max{hist$\Delta x_1$(0), hist$\Delta x_2$(0), hist$\Delta y_1$(0), hist$\Delta y_2$(0)})= hist$\Delta y_1$(0)
    then the text in the digital document image may be oriented 180° clockwise (or 180° counter-clockwise) with respect to the original document text;
if(max{hist$\Delta x_1$(0), hist$\Delta x_2$(0), hist$\Delta y_1$(0), hist$\Delta y_2$(0)})= hist$\Delta y_2$(0)
    then the text in the digital document image may be oriented 0 with respect to the original document text, where hist$\Delta x_1(0)$, hist$\Delta x_2(0)$, hist$\Delta y_1(0)$ and hist$\Delta y_2(0)$ are the bin counts for the bins corresponding to $\Delta x_1=0$, $\Delta x_2 0$, $\Delta y_1=0$ and $\Delta y_2=0$ respectively.

In a language in which the text may have relatively more text characters with descenders than text characters with ascenders, the text alignment in the digital document image may be determined according to:

if(max{hist$\Delta x_1(0)$, hist$\Delta x_2(0)$, hist$\Delta y_1(0)$, hist$\Delta y_2(0)$})=hist$\Delta x_2(0)$ then the text in the digital document image may be oriented 90° clockwise (or 270° counter-clockwise) with respect to the original document text;

if(max{hist$\Delta x_1(0)$, hist$\Delta x_2(0)$, hist$\Delta y_1(0)$, hist$\Delta y_2(0)$})=hist$\Delta x_2(0)$ then the text in the digital document image may be oriented 270° clockwise (or 90° counter-clockwise) with respect to the original document text;

if(max{hist$\Delta x_1(0)$, hist$\Delta x_2(0)$, hist$\Delta y_1(0)$, hist$\Delta y_2(0)$})=hist$\Delta y_2(0)$ then the text in the digital document image may be oriented 180° clockwise (or 180° counter-clockwise) with respect to the original document text;

if(max{hist$\Delta x_1(0)$, hist$\Delta x_2(0)$, hist$\Delta y_1(0)$, hist$\Delta y_2(0)$})=hist$\Delta y_1(0)$ then the text in the digital document image may be oriented 0° with respect to the original document text, where hist$\Delta x_1(0)$, hist$\Delta x_2(0)$, hist$\Delta y_1(0)$ and hist$\Delta y_2(0)$ are the bin counts for the bins corresponding to $\Delta x_1=0$, $\Delta x_2=0$, $\Delta y_1=0$ and $\Delta y_2=0$, respectively.

Figure 7:
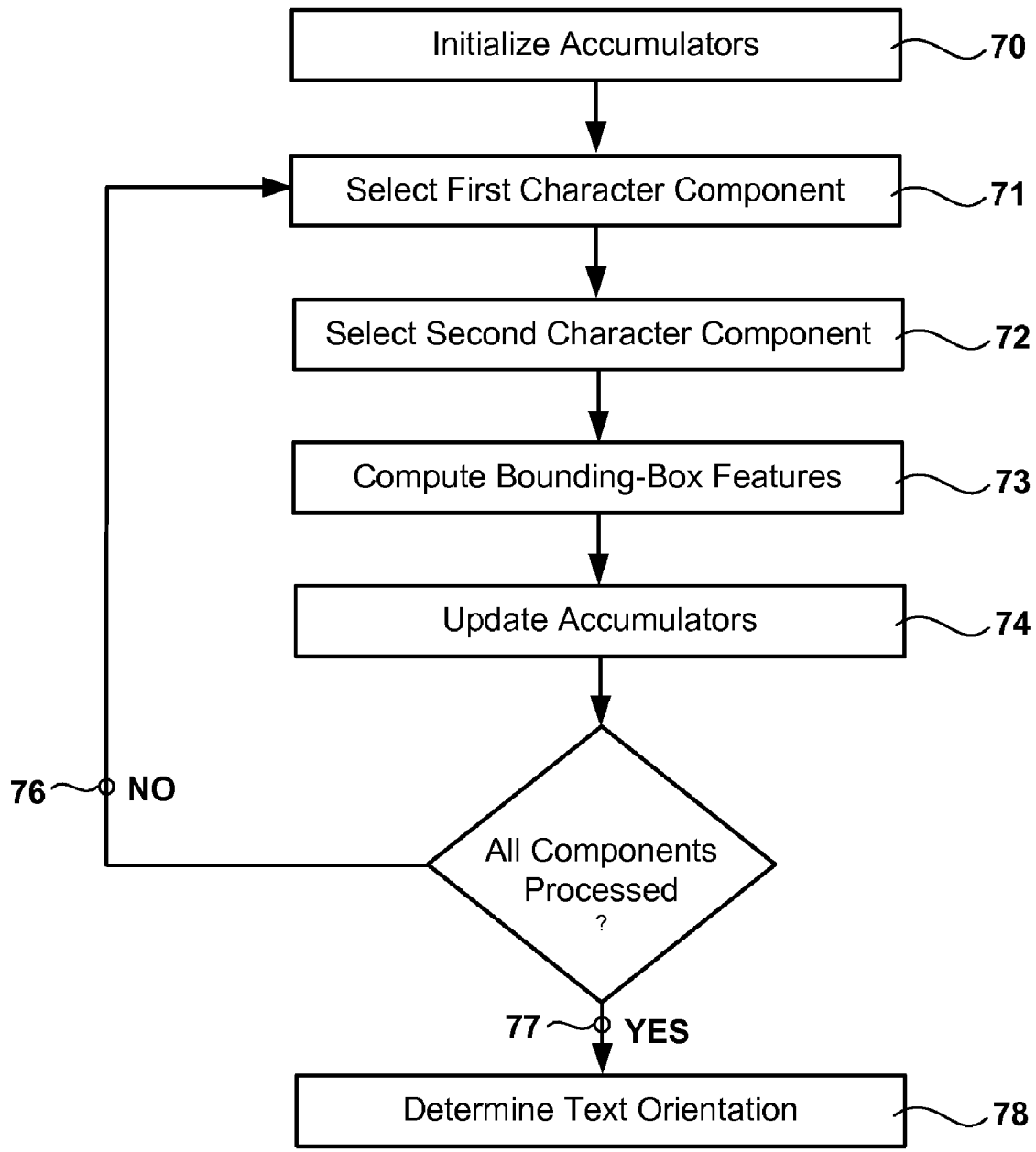
FIG. 7 is a chart showing embodiments of the present invention comprising alignment features measured between text characters in a text character pair.

Some embodiments of the present invention comprising character-pair feature measurements may be described in relation to FIG. 7. In these embodiments, all accumulators, hist$\Delta x_1$, hist$\Delta x_2$, hist$\Delta y_1$ and hist$\Delta y_2$, may be initialized 70. In some embodiments, the accumulators may be initialized to zero. A first character component may be selected 71 from available character components. A second character component, related to the first character component, may be selected 72. The bounding-box features may be computed 73 for the character pair, and the respective accumulator bins updated 74. If there are additional components available for processing 76, then the process may be repeated. If all available components have been processed 77, then text orientation may be determined 78 based on the accumulators.

Figure 8A:
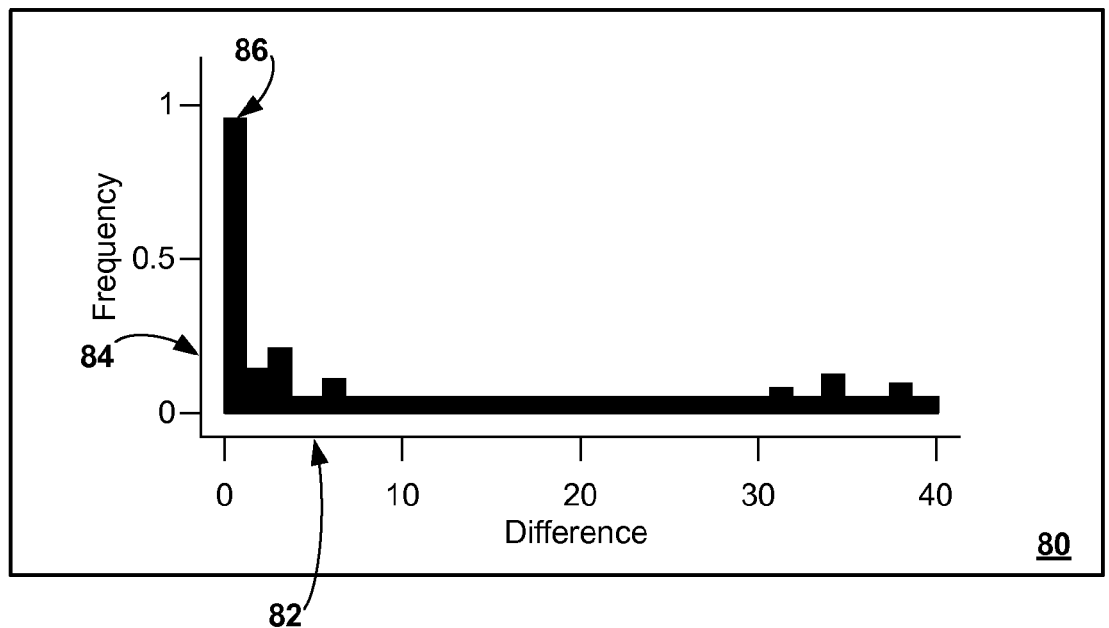
FIG. 8A is a drawing showing an exemplary histogram of a component-pair alignment feature.
Figure 8B:
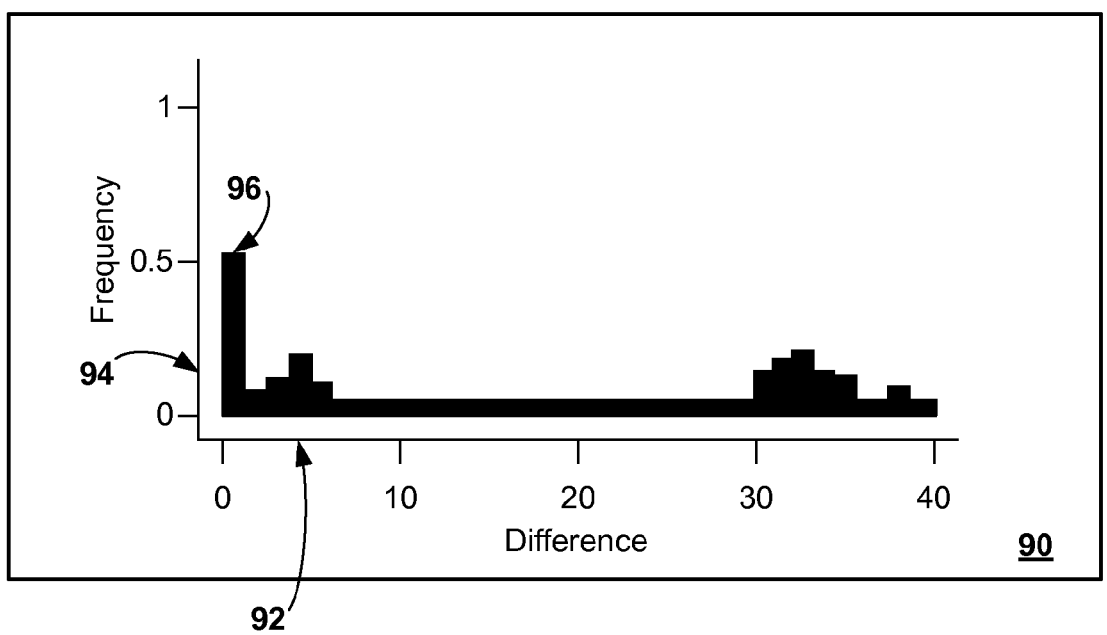
FIG. 8B is a drawing showing an exemplary histogram of a component-pair alignment feature.
Figure 8C:
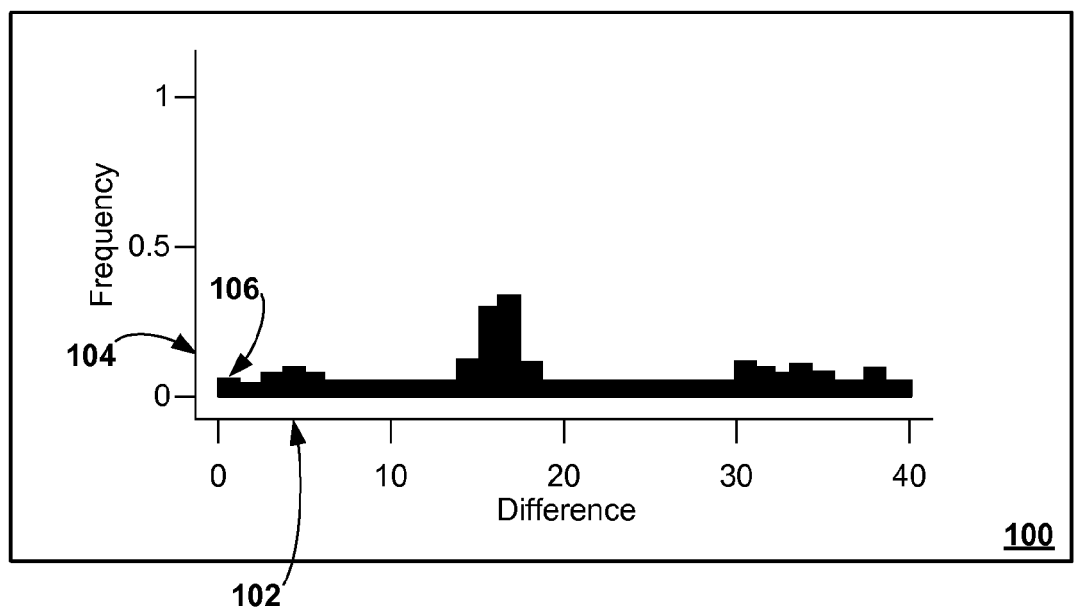
FIG. 8C is a drawing showing an exemplary histogram of a component-pair alignment feature.
Figure 8D:
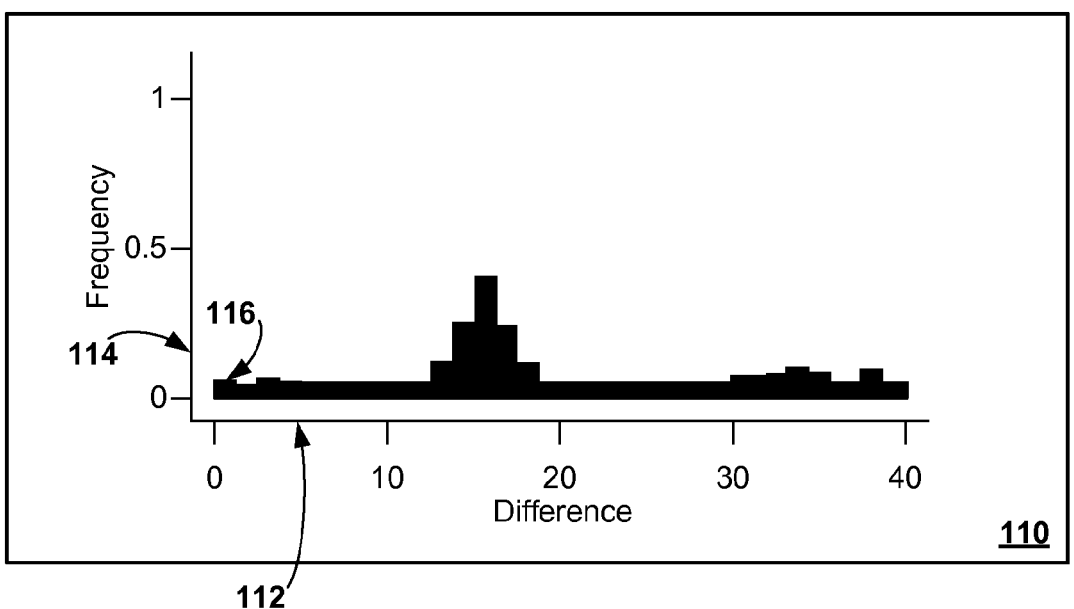
FIG. 8D is a drawing showing an exemplary histogram of a component-pair alignment feature.

FIGS. 8A-8D depict exemplary histograms 80, 90, 100, 110 for the four bounding-box features. FIG. 8A illustrates an exemplary histogram 80 for $\Delta x_1$. The horizontal axis 82 may comprise bins corresponding to $\Delta x_1$ values, and the vertical axis 84 may comprise the frequency of occurrence of a $\Delta x_1$ value corresponding to the associated bin. FIG. 8B illustrates an exemplary histogram 90 for $\Delta x_2$. The horizontal axis 92 may comprise bins corresponding to $\Delta x_2$ values, and the vertical axis 94 may comprise the frequency of occurrence of a $\Delta x_2$ value corresponding to the associated bin. FIG. 8C illustrates an exemplary histogram 100 for $\Delta y_1$. The horizontal axis 102 may comprise bins corresponding to $\Delta y_1$ values, and the vertical axis 104 may comprise the frequency of occurrence of a $\Delta y_1$ value corresponding to the associated bin. FIG. 8D illustrates an exemplary histogram 110 for $\Delta y_2$. The horizontal axis 112 may comprise bins corresponding to $\Delta y_2$ values, and the vertical axis 114 may comprise the frequency of occurrence of a $\Delta y_2$ value corresponding to the associated bin. The feature with the largest bin count for feature value equal to zero 86, 96, 106, 116 is $\Delta x_2$, for this illustrative example. The text in the digital document image may be determined to be oriented 270° clockwise (or 90° counter-clockwise) with respect to the original document text based on these accumulator values.

In alternative embodiments of the present invention, the sum of the first n bins in each histogram may be used to determine text orientation.

In some embodiments of the present invention, each bin in a histogram may correspond to a single feature value. In alternative embodiments of the present invention, each bin in a histogram may correspond to a range of feature values.

In some embodiments of the present invention, each histogram may only have bins corresponding to feature values below a threshold, and measured feature values above the threshold may not be accumulated. This may reduce the storage or memory requirements for a histogram. In some embodiments of the present invention, the histogram may be a single accumulator in which only feature values below a threshold may be accumulated.

In some embodiments of the present invention, a second character component in a character pair may be selected 72 as the character component nearest to the first character component. In alternative embodiments, the second character component may be selected 72 as a character component along the same text line as the first character component. In these embodiments, text lines may be identified prior to character component selection 71, 72.

Figure 9:
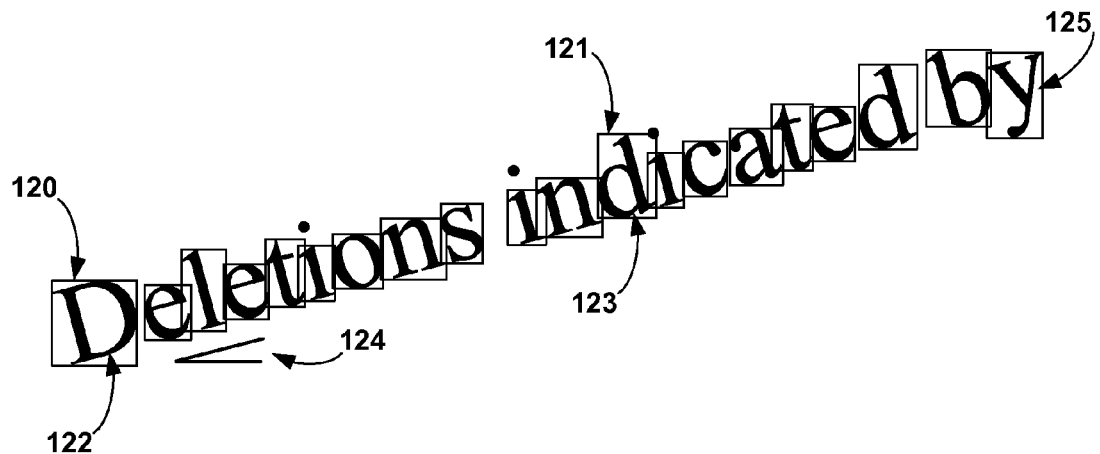
FIG. 9 is a drawing showing an exemplary skewed line of text with character bounding boxes relative to the un-skewed coordinate system.

In some embodiments of the present invention, a skew angle, denoted $\theta$, may be known for a skewed, digital document image. As shown in FIG. 9, bounding boxes, for example, 120, 121, for the skewed character components, 122, 123, may be aligned with the x-axis and the y-axis, and the bounding boxes, 120, 121, may be offset horizontally and vertically according to the skew angle 124 of the text line 125.

In some embodiments of the present invention, the digital document image may be first corrected according to the known skew angle, and the orientation methods described above may be applied directly to the skew-corrected image.

In alternative embodiments of the present invention, coordinates of each character-component pixel may be computed in a rotated coordinate system, wherein the x-axis and y-axis are rotated by the skew angle, $\theta$. The location, $(p_r, p_s)$, in the rotated coordinate system of a pixel with x-coordinate, $p_x$, and y-coordinate, $p_y$, may be found according to:

$p_r = p_x \cos\theta + p_y \sin\theta$ and $p_s = -p_x \sin\theta + p_y \cos\theta$.

Figure 10:
FIG. 10 is a drawing showing an exemplary skewed line of text with character bound boxes relative to the skewed coordinate system.

The bounding box of a character component, denoted $\gamma$, in the de-skewed coordinate system, may be found according to:

$\gamma(x_1) = \min(r_1, r_2, \ldots, r_M)$;

$\gamma(x_2) = \max(r_1, r_2, \ldots, r_M)$;

$\gamma(y_1) = \min(s_1, s_2, \ldots, s_M)$; and $\gamma(y_2) = \min(s_1, s_2, \ldots, s_M)$, where M denotes the number of pixels that form the character component $\gamma$. Alignment features may be computed using the de-skewed bounding box. FIG. 10 illustrates a line of skewed text 125 with bounding boxes, for example 126, 127, shown in the rotated coordinate system.

Figure 11:
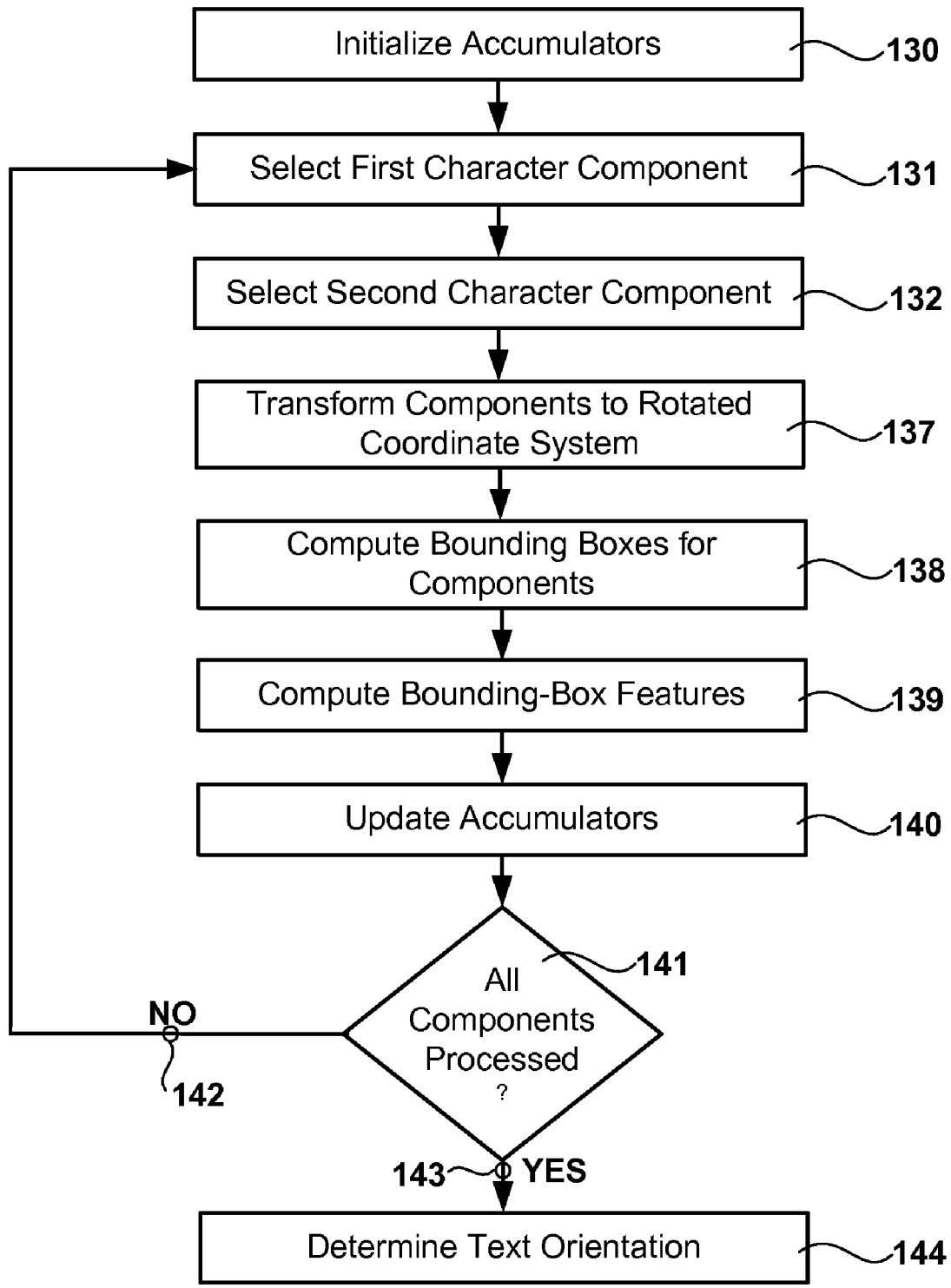
FIG. 11 is a chart showing embodiments of the present invention comprising text-orientation detection in a skewed document using character pair feature measurements.

Embodiments of the present invention for detecting text orientation in a skewed document image may be described in relation to FIG. 11. In these embodiments, all accumulators, hist$\Delta x_1$, hist$\Delta x_2$, hist$\Delta y_1$ and hist$\Delta y_2$, may be initialized 130. In some embodiments, the accumulators may be initialized to zero. A first character component may be selected 131 from available character components. A second character component, related to the first character component, may be selected 132. The first character component and the second character component may be transformed 137 to a rotated coordinate system associated with the skew angle, θ. The bounding boxes for the components in the skewed coordinate system may be computed 138. The bounding-box features may be computed 139 for the character pair, and the respective accumulator bins updated 140. If there are additional components available for processing 142, then the process may be repeated. If all available components have been processed 143, then text orientation may be determined 144 based on the accumulators.

Alternative embodiments of the present invention comprising character-pair feature measurements may be described in relation to FIG. 12. In these embodiments, all accumulators, hist$\Delta x_1$, hist$\Delta x_2$, hist$\Delta y_1$ and hist$\Delta y_2$, may be initialized 150. In some embodiments, the accumulators may be initialized to zero. A first character component may be selected 151 from available character components. A second character component, related to the first character component, may be selected 152. The size difference between the first character component and the second character component may be estimated 153. The size difference may be compared 154 to a threshold, and if the first and second character components are not sufficiently different in size 155, then the availability of additional components for processing may be checked 161. If there are additional components available for processing 162, then the process may be repeated. If all available components have been processed 163, then text orientation may be determined 164 based on the accumulators.

If the first and second character components are sufficiently different in size 156, The bounding-box features may be computed 159 for the character pair, and the respective accumulator bins updated 160. If there are additional components available for processing 162, then the process may be repeated. If all available components have been processed 163, then text orientation may be determined 164 based on the accumulators.

Alternative embodiments of the present invention comprising character-pair feature measurements may be described in relation to FIG. 13. In these embodiments, all accumulators, hist$\Delta x_1$, hist$\Delta x_2$, hist$\Delta y_1$ and hist$\Delta y_2$, may be initialized 170. In some embodiments, the accumulators may be initialized to zero. A first character component may be selected 171 from available character components. A second character component, related to the first character component, may be selected 172. The size difference between the first character component and the second character component may be estimated 173. In some embodiments, the size difference may be estimated using the bounding box dimensions in the original coordinate system. In alternative embodiments, the bounding box coordinates may be projected into the de-skewed coordinate system and used to estimate the size difference. The size difference may be compared 174 to a threshold, and if the first and second character components are not sufficiently different in size 175, then the availability of additional components for processing may be checked 181. If there are additional components available for processing 182, then the process may be repeated. If all available components have been processed 183, then text orientation may be determined 184 based on the accumulators.

If the first and second character components are sufficiently different in size 176, The first character component and the second character component may be transformed 177 to a rotated coordinate system associated with the skew angle, θ. The bounding boxes for the components in the skewed coordinate system may be computed 178. The bounding-box features may be computed 179 for the character pair, and the respective accumulator bins updated 180. If there are additional components available for processing 182, then the process may be repeated. If all available components have been processed 183, then text orientation may be determined 184 based on the accumulators.

In some embodiments of the present invention, a text orientation may be determined for an entire page in the digital document image. In alternative embodiments of the present invention, text orientation may be determined on a region-by-region basis.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining a text orientation in a digital image, said method comprising:

in a first text line comprising a first plurality of text characters in a digital image, determining a first text-line orientation of said first text line, wherein said determining said first text-line orientation comprises:
determining a text-line bounding box for said first text line;
calculating an aspect ratio for said text-line bounding box; and
calculating said first text-line orientation based on said aspect ratio;
determining, for each of said text characters in said first plurality of text characters, a first-edge position measurement corresponding to a bounding edge associated with a first side of said first text line, thereby producing a plurality of first-edge position measurements;
determining, for each of said text characters in said first plurality of text characters, a second-edge position measurement corresponding to a bounding edge associated with a second side of said first text line, thereby producing a plurality of second-edge position measurements;
computing a first first-alignment feature value relative to said first text-line orientation for said first text line in said digital image, wherein said computing a first first-alignment feature comprises:
calculating a sample mean for said plurality of first-edge position measurements, thereby producing a ceiling measurement; and
calculating an error measure between said ceiling measurement and said plurality of first-edge position measurements, thereby producing said first first-alignment feature value;
computing a first second-alignment feature value relative to said first text-line orientation for said first text line in said digital image, wherein said computing a first second-alignment feature comprises:
calculating a sample mean for said plurality of second-edge position measurements, thereby producing a floor measurement: and
calculating an error measure between said floor measurement and said plurality of second-edge position measurements, thereby producing said first second-alignment feature value; and
determining a first text orientation of said first plurality of text characters in said digital image based on said first first-alignment feature value and said first second-alignment feature value, wherein said determining said first text orientation comprises determining a baseline-side of said first text line, wherein said determining said baseline-side of said first text line is based on the relative values of said first first-alignment feature value and said first second-alignment feature value and a relative frequency of occurrence of text characters with ascenders and text characters with descenders in a written language.

2. A method for determining a text orientation in a digital image, said method comprising:

in a first text line comprising a first plurality of text characters in a digital image, determining a first text-line orientation of said first text line;

determining, for each of said text characters in said first plurality of text characters, a first-edge position measurement corresponding to a bounding edge associated with a first side of said first text line, thereby producing a plurality of first-edge position measurements;

determining, for each of said text characters in said first plurality of text characters, a second-edge position measurement corresponding to a bounding edge associated with a second side of said first text line, thereby producing a plurality of second-edge position measurements; orientation for said first text line in said digital image, wherein said computing first-alignment feature comprises:

calculating a sample mean for said plurality of first-edge position measurements, thereby producing a ceiling measurement; and calculating an error measure between said ceiling measurement and said plurality of first-edge position measurements, thereby producing said first first-alignment feature value;

computing a first second-alignment feature value relative to said first text-line orientation for said first text line in said digital image, wherein said computing a first second-alignment feature comprises:

calculating a sample mean for said plurality of second-edge position measurements, thereby producing a floor measurement; and calculating an error measure between said floor measurement and said plurality of second-edge position measurements, thereby producing said first second-alignment feature value;

determining a first text orientation of said first plurality of text characters in said digital image based on said first first-alignment feature value and said first second-alignment feature value; and wherein said determining a first text-line orientation comprises:

determining a text-line bounding box for said first text line;

calculating an aspect ratio for said text-line bounding box; and determining said first text-line orientation based on said aspect ratio.

3. A method for determining a text orientation in a digital image, said method comprising:

in a first text line comprising a first plurality of text characters in a digital image, determining a first text-line orientation of said first text line, wherein said determining said first text-line orientation comprises:

determining a text-line bounding box for said first text line;

calculating an aspect ratio for said text-line bounding box; and calculating said first text-line orientation based on said aspect ratio;

determining a first-side reference line for a first side of said first text line, said first-side reference line characterized by a first-side-reference-line position measurement;

determining a second-side reference line for a second side of said first text line, said second-side reference line characterized by a second-side-reference-line position measurement;

determining, for each of said first plurality of text characters, a first-edge position measurement corresponding to a bounding edge associated with a first side of said first text line, thereby producing a plurality of first-edge position measurements;

determining, for each of said first plurality of text characters, a second-edge position measurement corresponding to a bounding edge associated with a second side of said first text line, thereby producing a plurality of second-edge position measurements;

computing a first first-alignment feature value relative to said first text-line orientation for said first text line in said digital image, wherein said computing a first first-alignment feature comprises:

calculating a difference between each of said plurality of first-edge position measurements and said first-side-reference-line position measurement, thereby producing a first plurality of difference measurements;

calculating a first maximum, said first maximum corresponding to the maximum value of said first plurality of difference measurements;

calculating the absolute value of the difference between each of said first plurality of difference measurements and said first maximum, thereby producing a first plurality of difference-from-maximum values; and summing said first plurality of difference-from-maximum values, thereby producing said first first-alignment feature value;

computing a first second-alignment feature value relative to said first text-line orientation for said first text line in said digital image, wherein said computing a first second-alignment feature comprises:

calculating a difference between each of said plurality of second-edge position measurements and said second-side-reference-line position measurement, thereby producing a second plurality of difference measurements;

calculating a second maximum, said second maximum corresponding to the maximum value of said second plurality of difference measurements;

calculating the absolute value of the difference between each of said second plurality of difference measurements and said second maximum, thereby producing a second plurality of difference-from-maximum values; and summing said second plurality of difference-from-maximum values, thereby producing said first second-alignment feature value; and determining a first text orientation of said first plurality of text characters in said digital image based on said first first-alignment feature value and said first second-alignment feature value, wherein said determining said first text orientation comprises determining a baseline-side of said first text line, wherein said determining said baseline-side of said first text line is based on the relative values of said first first-alignment feature value and said first second-alignment feature value and a relative frequency of occurrence of text characters with ascenders and text characters with descenders in a written language.

4. A system for determining a text orientation in a digital image, said system comprising a non-transitory computer-readable medium comprising:
- a text-line orientation determiner for determining a first text-line orientation of a first text line in a digital image, wherein said first text line comprises a first plurality of text characters;
- a bounding-box determiner for determining a bounding box for each of said first plurality of text characters, thereby producing a plurality of bounding boxes, wherein each of said bounding boxes comprises:
  - a first edge, said first edge characterized by a first-edge position measurement, thereby producing a plurality of first-edge position measurements, and said first edge associated with a first side of said first text line; and
  - a second edge, said second edge characterized by a second-edge position measurement, thereby producing a plurality of second-edge position measurements, and said second edge associated with a second side of said first text line;
- a first alignment feature calculator for computing a first-alignment feature value relative to said first text-line orientation for said first text line in said digital image, wherein first-alignment feature calculator comprises:
  - a first sample-mean calculator for calculating a sample mean for said plurality of first-edge position measurements, thereby producing a ceiling measurement; and
  - a first error-measure calculator for calculating an error measure between said ceiling measurement and said plurality of first-edge position measurements, thereby producing said first first-alignment feature value;
- a second alignment feature calculator for computing a second-alignment feature value relative to said first text-line orientation for said first text line in said digital image, wherein said second-alignment feature calculator comprises:
  - a second sample-mean calculator for calculating a sample mean for said plurality of second-edge position measurements, thereby producing a floor measurement; and
  - a second error-measure calculator for calculating an error measure between said floor measurement and said plurality of second-edge position measurements, thereby producing said first second-alignment feature value:
- a text orientation determiner for determining a text orientation of said first plurality of text characters in said digital image based on said first first-alignment feature value and said first second-alignment feature value, wherein said determining said text orientation comprises determining a baseline-side of said first text line, wherein said determining said baseline-side of said first text line is based on the relative values of said first-alignment feature value and said second-alignment feature value and a relative frequency of occurrence of text characters with ascenders and text characters with descenders in a written language; and
- wherein said text-line orientation determiner comprises:
  - a text-line bounding box determiner for determining a text-line bounding box for said first text line;
  - an aspect-ratio calculator for calculating an aspect ratio for said text-line bounding box; and
  - wherein said text-line orientation determiner determines said text-line orientation based on said aspect ratio.

5. A system for determining a text orientation in a digital image, said system comprising a non-transitory computer-readable medium comprising:
- a text-line orientation determiner for determining a first text-line orientation of a first text line in a digital image, wherein said first text line comprises a first plurality of text characters;
- a text-line bounding box determiner for determining a first-text-line bounding box for said first text line, wherein said first-text-line bound box comprises:
  - a first-text-line first edge, said first-text-line first edge characterized by a first-text-line-first-edge position measurement and said first-text-line first edge associated with a first text-line-side of said first text line; and
  - a first-text-line second edge, said first-text-line second edge characterized by a first-text-line-second-edge position measurement and associated with a second text-line-side of said first text line;
- a character-bounding-box determiner for determining a bounding box for each of said first plurality of text characters, thereby producing a plurality of bounding boxes, wherein each of said bounding boxes comprises:
  - a first edge, said first edge characterized by a first-edge position measurement, thereby producing a plurality of first-edge position measurements, and said first edge associated with a first side of said first text line; and
  - a second edge, said second edge characterized by a second-edge position measurement, thereby producing a plurality of second-edge position measurements, and said second edge associated with a second side of said first text line;
- a first alignment feature calculator for computing a first alignment feature value relative to said first text-line orientation for said first text line in said digital image, wherein said first alignment feature calculator comprises:
  - a first difference calculator for calculating a difference between each of said plurality of first-edge position measurements and said first-text-line first-edge position measurement, thereby producing a first plurality of difference measurements;
  - a first maximum calculator for calculating a first maximum, said first maximum corresponding to the maximum value of said first plurality of difference measurements;
  - a first absolute-value calculator for calculating the absolute value of the difference between each of said first plurality of difference measurements and said first maximum, thereby producing a first plurality of difference-from-maximum values; and
  - a first accumulator for summing said first plurality of difference-from-maximum values, thereby producing said first first-alignment feature value;
- a second alignment feature calculator for computing a second alignment feature value relative to said first text-line orientation for said first text line in said digital image, wherein said second alignment feature calculator comprises:
  - a second difference calculator for calculating a difference between each of said plurality of second-edge position measurements and said first-text-line second-edge position measurement, thereby producing a second plurality of difference measurements;

a second maximum calculator for calculating a second maximum, said second maximum corresponding to the maximum value of said second plurality of difference measurements;

a second absolute-value calculator for calculating the absolute value of the difference between each of said second plurality of difference measurements and said second maximum, thereby producing a second plurality of difference-from-maximum values; and a second accumulator for summing said second plurality of difference-from-maximum values, thereby producing said first second-alignment feature value; and a text orientation determiner for determining a text orientation of said first plurality of text characters in said digital image based on said first first-alignment feature value and said first second-alignment feature value, wherein said determining said text orientation comprises determining a baseline-side of said first text line, wherein said determining said baseline-side of said first text line is based on the relative values of said first alignment feature value and said second alignment feature value and a relative frequency of occurrence of text characters with ascenders and text characters with descenders in a written language; and wherein said text-line orientation determiner comprises:
a text-line bounding box determiner for determining a text-line bounding box for said first text line;
an aspect-ratio calculator for calculating an aspect ratio for said text-line bounding box; and
wherein said text-line orientation determiner determines said text-line orientation based on said aspect ratio.

6. A method according to claim 2 further comprising:
in a second text line comprising a second plurality of text characters in said digital image, determining a second text-line orientation of said second text line;
computing a second first-alignment feature value relative to said second text-line orientation for said second text line in said digital image;
computing a second second-alignment feature value relative to said second text-line orientation for said second text line in said digital image;
determining a second text orientation of said second plurality of text characters in said digital image based on said second first-alignment feature value and said second second-alignment feature value; and
determining a page text orientation based on said first text orientation and said second text orientation.

7. A method according to claim 1 further comprising:
in a second text line comprising a second plurality of text characters in said digital image, determining a second text-line orientation of said second text line;
computing a second first-alignment feature value relative to said second text-line orientation for said second text line in said digital image;
computing a second second-alignment feature value relative to said second text-line orientation for said second text line in said digital image;
determining a second text orientation of said second plurality of text characters in said digital image based on said second first-alignment feature value and said second second-alignment feature value; and
determining a page text orientation based on said first text orientation and said second text orientation.

8. A method according to claim 2 further comprising projecting said first plurality of text characters according to a skew angle prior to said determining, for each of said first plurality of text characters, said first-edge position measurement and prior to said determining, for each of said first plurality of text characters, said second-edge position measurement.

9. A method according to claim 1 further comprising projecting said first plurality of text characters according to a skew angle prior to said determining, for each of said first plurality of text characters, said first-edge position measurement and prior to said determining, for each of said first plurality of text characters, said second-edge position measurement.

10. A method according to claim 2, wherein said determining a first text orientation comprises:
determining a baseline-side of said first text line, wherein said determining said baseline-side of said first text line is based on the relative values of said first first-alignment feature value and said first second-alignment feature value and a relative frequency of occurrence of text characters with ascenders and text characters with descenders in a written language.

11. A method according to claim 1, wherein said determining a baseline-side of said first text line comprises:
associating said baseline-side of said first text line with said first side of said first text line when said first first-alignment feature value is less than said first second-alignment feature value; and
associating said baseline-side of said first text line with said second side of said first text line when said first second-alignment feature value is less than said first first-alignment feature value.

12. A method according to claim 1, wherein said determining a baseline-side of said first text line comprises:
receiving a language indicator for said digital image, wherein said language indicator indicates the language in which said first text line is written;
determining a relative likelihood of text characters with descenders to text characters with ascenders in said language;
associating said baseline-side of said first text line with said first side of said first text line when said first first-alignment feature value is less than said first second-alignment feature value and said relative likelihood indicates that text characters with descenders are less likely than text characters with ascenders;
associating said baseline-side of said first text line with said second side of said first text line when said first second-alignment feature value is less than said first first-alignment feature value and said relative likelihood indicates that text characters with descenders are less likely than text characters with ascenders;
associating said baseline-side of said first text line with said first side of said first text line when said second first-alignment feature value is greater than said first second-alignment feature value and said relative likelihood indicates that text characters with ascenders are less likely than text characters with descenders; and
associating said baseline-side of said first text line with said second side of said first text line when said second first-alignment feature value is less than said first and said relative likelihood indicates that text characters with ascenders are less likely than text characters with descenders.

13. A method according to claim 1, wherein said error measure between said floor measurement and said plurality of second-edge position measurements is an error measure selected from the group consisting of mean absolute error, mean-square error and root mean-square error.

14. A method according to claim 1, wherein said error measure between said ceiling measurement and said plurality of first-edge position measurements is an error measure selected from the group consisting of mean absolute error, mean-square error and root mean-square error.

15. A method according to claim 3, wherein said first-side reference line corresponds to a first side of a bounding box for said first text line and said second-side reference line corresponds to a second side of said bounding box for said first text line.

16. A method according to claim 7, wherein said determining a second text orientation comprises:
   determining a baseline-side of said second text line, wherein said determining said baseline-side of said second text line is based on the relative values of said second first-alignment feature value and said second second-alignment feature value and a relative frequency of occurrence of text characters with ascenders and text characters with descenders in a written language.

17. A method according to claim 3, wherein said determining a baseline-side of said first text line comprises:
   associating said baseline-side of said first text line with said first side of said first text line when said first first-alignment feature value is less than said first second-alignment feature value; and
   associating said baseline-side of said first text line with said second side of said first text line when said first second-alignment feature value is less than said first first-alignment feature value.

18. A method according to claim 3, wherein said determining a baseline-side of said first text line comprises:
   receiving a language indicator for said digital image, wherein said language indicator indicates the language in which said first text line is written;
   determining a relative likelihood of text characters with descenders to text characters with ascenders in said language;
   associating said baseline-side of said first text line with said first side of said first text line when said first first-alignment feature value is less than said first second-alignment feature value and said relative likelihood indicates that text characters with descenders are less likely than text characters with ascenders;
   associating said baseline-side of said first text line with said second side of said first text line when said first second-alignment feature value is less than said first first-alignment feature value and said relative likelihood indicates that text characters with descenders are less likely than text characters with ascenders;
   associating said baseline-side of said first text line with said first side of said first text line when said second first-alignment feature value is greater than said first second-alignment feature value and said relative likelihood indicates that text characters with ascenders are less likely than text characters with descenders; and
   associating said baseline-side of said first text line with said second side of said first text line when said second first-alignment feature value is less than said first and said relative likelihood indicates that text characters with ascenders are less likely than text characters with descenders.

19. A method according to claim 3 further comprising projecting said first plurality of text characters according to a skew angle prior to said determining, for each of said first plurality of text characters, said first-edge position measurement and prior to said determining, for each of said first plurality of text characters, said second-edge position measurement.

20. A system according to claim 4, wherein said text orientation determiner comprises:
   a baseline-side determiner for determining said baseline-side of said first text line.

21. A system according to claim 5, wherein said text orientation determiner comprises a baseline-side determiner for determining said baseline-side of said first text line.

* * * * *

UNITED STATES PATENT AND TRADEMARK OFFICE
CERTIFICATE OF CORRECTION

PATENT NO. : 8,208,725 B2
APPLICATION NO. : 11/766640
DATED : June 26, 2012
INVENTOR(S) : Ahment Mufit Ferman and Jon M. Speigle It is certified that error appears in the above-identified patent and that said Letters Patent is hereby corrected as shown below:

Column 7, Line 35 should read:

$$\Delta_{top}(i) = y_1(i) - y_T, \; i = 1,\ldots, N \text{ and } \Delta_{bottom}(i) = y_B(i) - y_2,$$

Column 7, Line 39 should read:

$$\Delta_{top}(i) = x_1(i) - x_L, \; i = 1,\ldots, N \text{ and } \Delta_{bottom}(i) = x_R(i) - x_2,$$

Column 15, Line 23 should read:

computing a first first-alignment feature value relative to said first text-line orientation for said first text line in said digital image, Column 15, Line 24 should read:

wherein said computing a first first-alignment feature com-

Signed and Sealed this
Eighth Day of January, 2013

David J. Kappos
*Director of the United States Patent and Trademark Office*